Feb. 2, 1954 R. V. SEAHOLM 2,667,975
SELF-CLEANING STRAINER
Filed March 3, 1950 4 Sheets-Sheet 1

INVENTOR.
Rudolph V. Seaholm,
BY
Cromwell, Greist + Warden
Attys

Patented Feb. 2, 1954

2,667,975

UNITED STATES PATENT OFFICE 2,667,975

SELF-CLEANING STRAINER

Rudolph V. Seaholm, Chicago, Ill.

Application March 3, 1950, Serial No. 147,460

16 Claims. (Cl. 210—152)

The present invention pertains to improvements in a self-cleaning strainer adapted to filter sediment, impurities or foreign matter and the like from liquids, which strainer is of high capacity, considering its compact size, and is well adapted for large scale mining, industrial or municipal installations.

The strainer is of the type illustrated and described in my prior copending application Serial No. 17,755, filed March 29, 1948, now Patent No. 2,626,710, dated January 27, 1953; and the invention deals with various structural improvements in the latter for the purpose of obtaining increased liquid handling capacity, improved reliability, decreased cost of manufacture, facilitated inspection and maintenance and improved operating characteristics in general.

It is an object of the present invention to provide an improved self-cleaning liquid strainer of the foregoing type, whether a multi-stage installation employing a plurality of individual movable screens spaced longitudinally of the direction of flow of the liquid to be strained, as illustrated herein, or a single-stage type, in which strainer a screen or screens of improved construction are employed, presenting a maximum effective screening area for a given overall screen size.

Specifically, an object of the invention is to provide a strainer which includes one or more improved, reciprocatory type straining screens, characterized by a rectangular frame, a plurality of cross ribs extending across the frame which are spaced from one another in the direction of reciprocation thereof and are alternately overlapped relative to one another in the direction of liquid flow through the screen, i. e., transverse of the direction of reciprocation, and a flexible, mesh-type straining screen element sustained alternately at the overlapped ends of the successive ribs in a fashion to produce a longitudinally corrugated screening surface which presents maximum effective screening area for a given area of the frame on which the screen is supported.

Another object of the invention is to provide a corrugated straining screen structure of the foregoing type.

Still another object is to provide such a screen structure which is further characterized by provisions to improve the efficiency and reliability of the screening action by controlling the direction of flow of liquid through the screen, and which is braced and rigidified in an improved manner.

A further object of the invention is to provide a strainer including a housing having inlet and discharge passages, a screen structure including a rigid screen or staged screens movable in said housing transversely of the direction or path of flow between said passages, and screen backwash means of an improved, simplified character disposed in receiving relation to the screen or screens, in which said backwash means take the form of a pair of waste channels disposed on opposite sides of the liquid flow path and crossed by the screen structure in the movement thereof, and in which the screen embodies imperforate blocking elements reciprocable therewith and disposed on opposite sides of the screening area thereof to block said waste channels alternately as the screen moves thereacross, thereby insuring against the discharge through said waste channels of liquid other than that which has performed the screen backwashing function.

It is an object to provide a strainer having a movable screen and improved screen backwashing provisions of the sort referred to in the preceding paragraph, together with means to control the desired rate of backwashing in a very simple and convenient manner.

Another object is to provide an improved screen including a pervious fluid straining area, preferably characterized by a flexible mesh element and alternately overlapped supporting ribs therefor, as described above, in combination with one or more imperforate blocking elements reciprocable with the screen in fixed, laterally adjacent relation to said pervious area for the purpose referred to above.

A still further object of the invention is to provide a strainer, illustratively embodied as a reciprocable screen, self-cleaning type, including means to move the strainer screen transversely of a strainer housing across the path of liquid flowing through the housing and an indicator element secured to the screen and visible from the exterior of the housing for the purpose of enabling an observer to determine the rate of movement of the screen.

Yet another and more specific object is to provide a strainer construction including a screen, means to reciprocate the screen transversely of a strainer housing and an indicating element secured to the screen and projecting externally of the housing for the purpose referred to in the preceding paragraph, in which said screen is operatively connected to the reciprocating means and to the indicating element in an improved fashion.

The foregoing statements are indicative in a general way of the nature of the invention, but other and more specific objects will be apparent to those skilled in the art upon a full understanding of the construction and operation of the device.

A single embodiment of the invention is presented herein for purpose of illustration, but it will be appreciated that the invention is susceptible of incorporation in other modified forms coming equally within the scope of the appended claims.

Figure 1:
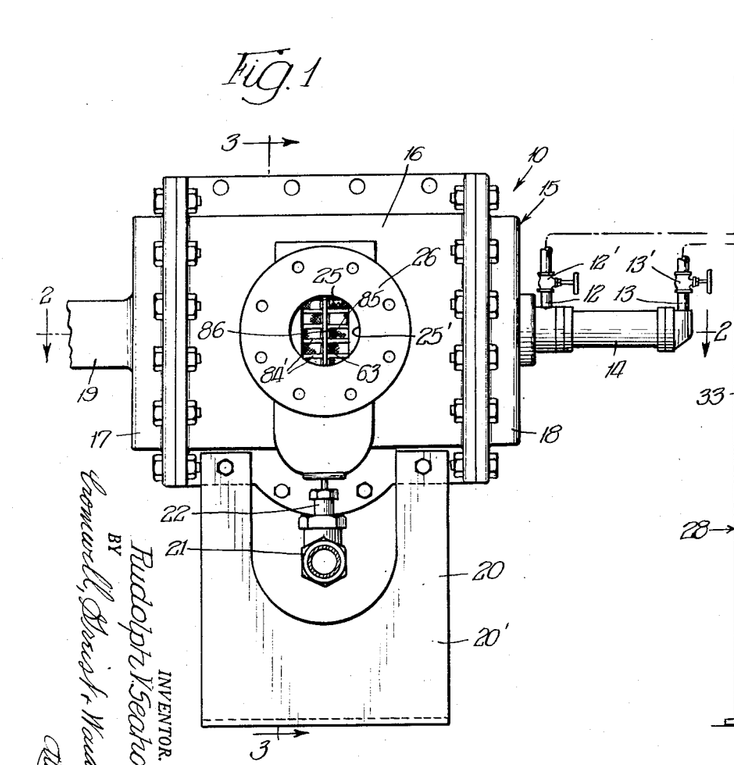
Figs. 1 and 1A are co-related views in end elevation illustrating, respectively, the exterior of the housing of a two stage strainer installation and the hydraulic screen actuating cylinder of the unit, together with the hydraulic power and control provisions which are operatively connected to the latter, the method of effecting the connection being indicated in broken lines.
Figure 1A:
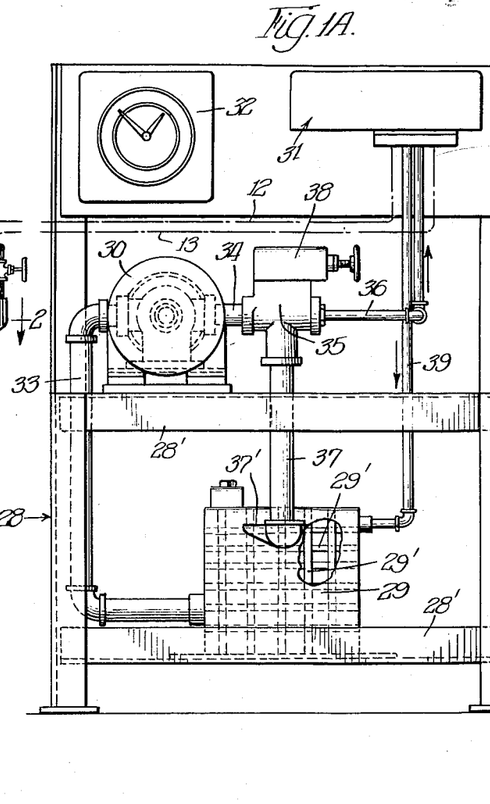

Referring particularly to Figs. 1 and 1A of the drawings, the strainer unit is generally designated by the reference numeral 10, being characterized by its pronounced compactness notwithstanding a large liquid handling capacity. A hydraulic power and control unit 11 is operatively connected with strainer unit 10 by means of the hydraulic pressure conduits 12, 13, preferably of a known armored flexible type, leading to the power mechanism 14 of the unit 10. This mechanism is a double acting, reciprocating plunger and cylinder type which requires no further description than to state that it embodies a plunger which reciprocates in a cylinder under the control of the unit 11, its plunger being directly connected to the reciprocating screen of the unit 10, to be described.

The strainer unit comprises a hollow cast or forged housing 15 of generally rectangular shape, made up of the central flanged body members or castings 16, two of which are clamped together to constitute the main body of the box-like strainer housing 15, and the coacting flanged end plates or castings 17, 18 which are securely bolted and sealed in leak-proof relation to the ends of the thus constituted body by well known means. The cylinder of hydraulic power mechanism 14 is appropriately secured to the end plate 18 to extend outwardly from the center thereof and the other end plate 17 includes a specially shaped, horizontally elongated and hollow extension 19 which is adapted to accommodate a horizontal crosshead of the strainer screen in the reciprocation of the latter. The housing 15 is supported by a rigid base 20 constituted by a pair of heavy braced metal plates 20'.

Figure 2:
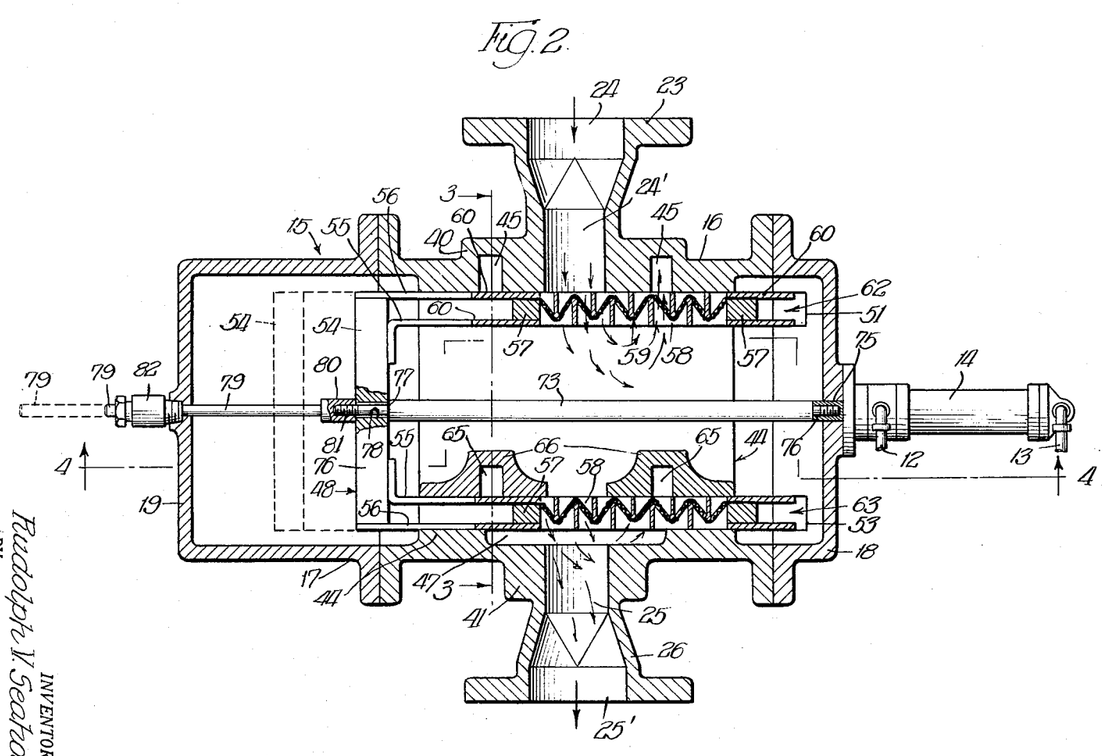
Fig. 2 is a somewhat enlarged view in horizontal section through the strainer of Fig. 1, approximately along line 2—2 of that figure, showing the relationship of the staged screen, screen backwash and screen operating provisions of the illustrated unit.
Figure 3:
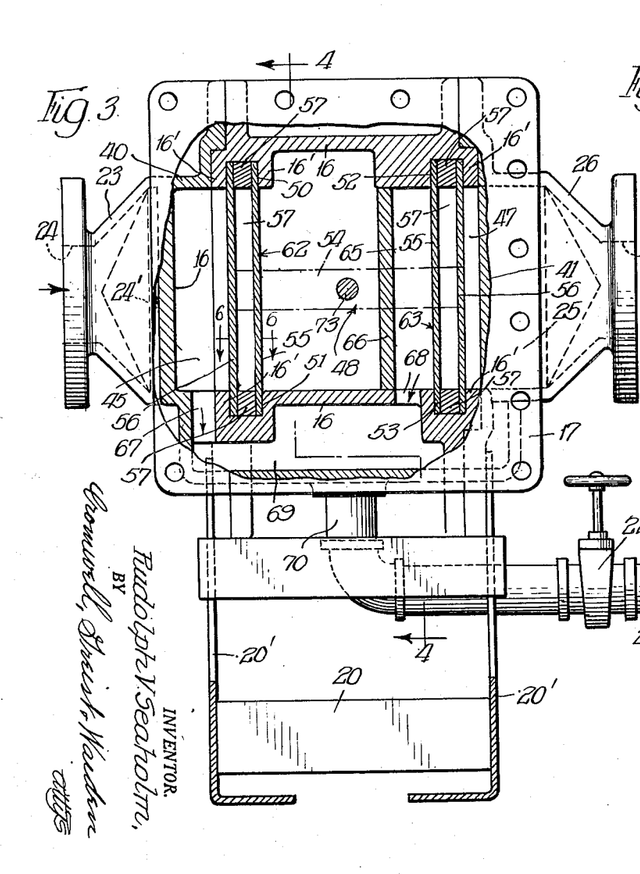
Fig. 3 is a view in side elevation of the strainer unit of Fig. 1, being partially broken away in section in a vertical longitudinal plane approximately along line 3—3 of Figs. 1 and 2, further illustrating the relationship of reciprocatory screens to the respective housing guides and backwash channels associated therewith.
Figures 4, 6, 7:
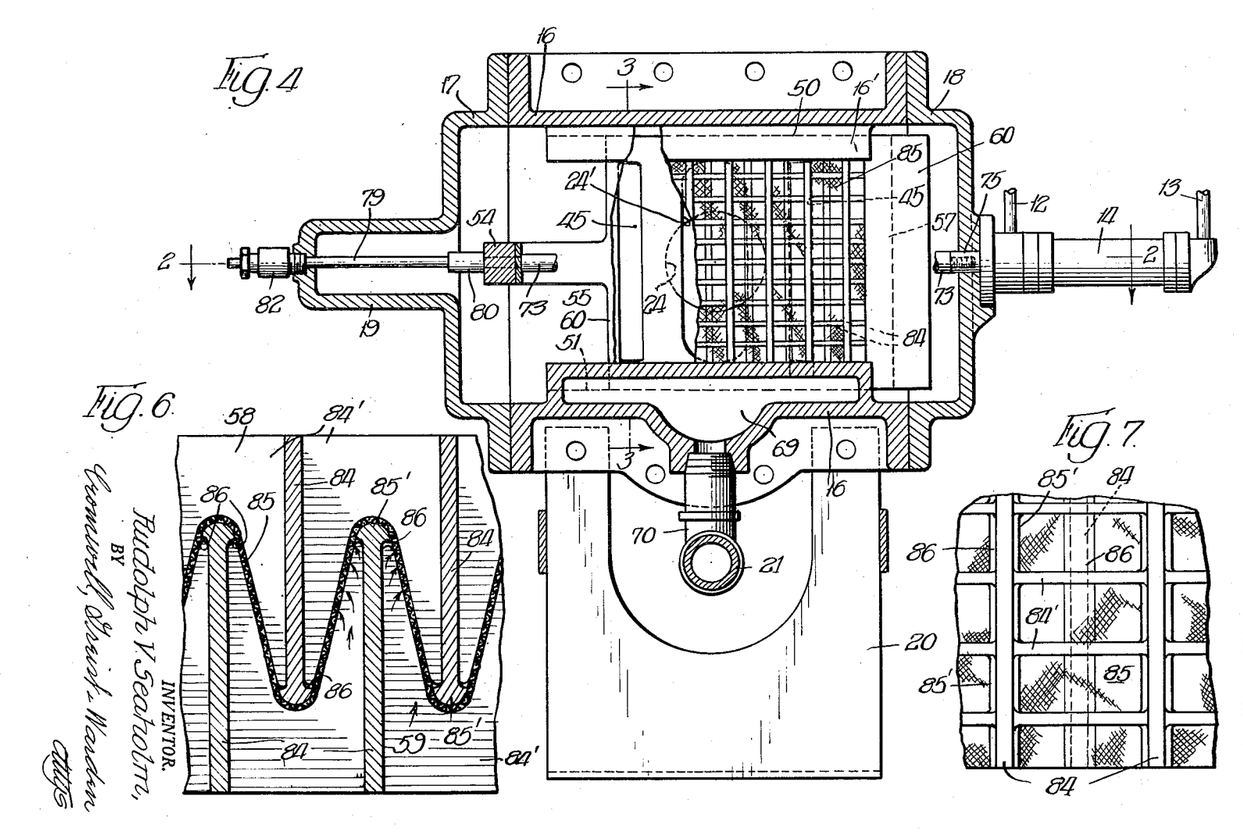
Fig. 4 is a view in transverse vertical section along a broken line generally corresponding to line 4—4 of Fig. 3, further showing the screen and reciprocating mechanism for the latter, being partially broken away to more clearly indicate the backwash channel liquid inlet and provisions opening to the interior of the strainer housing.
Fig. 6 is a greatly enlarged fragmentary view further illustrating the screen construction, being in horizontal section on a line corresponding to line 6—6 of Fig. 3.
Fig. 7 is a fragmentary view in elevation, further illustrating details of the improved screen construction, being viewed from a plane coincident with the lower margin of Fig. 6.
Figure 5:
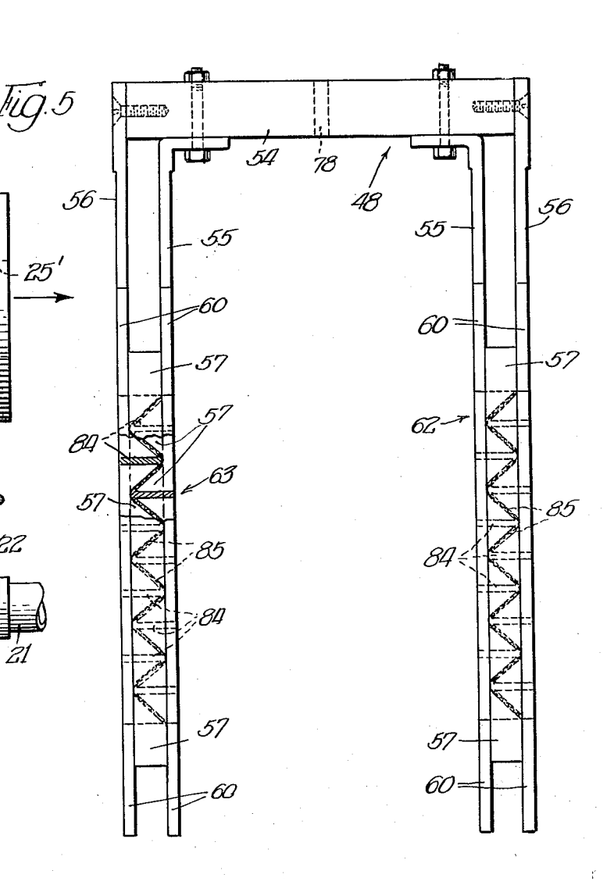
Fig. 5 is an enlarged plan view, partially broken away, generally illustrating the dual reciprocating screen which is employed in the illustrated strainer.

Waste liquid employed in the backwashing of the screen of the strainer is discharged from the bottom of the housing 15 through a discharge line 21 which is controlled by a manual valve 22. Liquid to be strained enters the housing through a flanged inlet fitting 23 having a circular inlet passage 24 opening to a vertically elongated inlet throat 24', as illustrated in Figs. 2, 3 and 4. The strained liquid exits from the housing through the vertically elongated discharge throat 25 and circular discharge passage 25' of a discharge fitting 26 located on the opposite side of the housing from the inlet fitting 23 and in alignment with the latter.

The hydraulic power and control unit 11 shown in Fig. 1A comprises a suitable supporting framework 28 providing cross supports 28' for a hydraulic liquid supply tank 29, a positive displacement pressure pump 30, a four-way, solenoid-controlled valve 31 of standard type and a timer unit 32. Unit 32 is electrically connected to the valve 31 to govern the energization of the solenoid element of the latter. It does this in properly timed fashion to control the application of hydraulic pressure through valve 31 to produce the desired reciprocation of the strainer screen. It has not been deemed necessary to illustrate specific details of these timer and solenoid valve mechanisms, nor the electrical operating connections thereof, in view of the conventional character of these devices and the further fact that the manner of interconnecting the same will be apparent to one skilled in the art and understanding the operation of the strainer unit 10. It is the sole purpose of the timer 32 and solenoid valve 31 to periodically reverse, at equal intervals, the supply and exhausting of hydraulic liquid through the conduits 12, 13 at opposite ends of hydraulic cylinder 14.

The tank 29 contains a supply of the hydraulic pressure liquid, which is preferably a suitable grade of hydrocarbon lubricating oil of relatively low viscosity, in order to minimize the possibility of freezing at low temperatures. However, it is contemplated that, if desired, the water or other liquid strained by the system may be employed as the pressure liquid. The liquid is withdrawn from tank 29 to the intake of the pump 30 through a supply pipe 33 and is discharged at the pump outlet 34. The latter in turn discharges to a control and over-capacity relief or control valve 35 and the hydraulic output pressure line 36 which leads to solenoid valve 31 is connected to the downstream side of the relief valve 35. Valve 31 governs the application of hydraulic pressure to mechanism 14 through one or the other of conduits 12, 13 in an obvious manner.

Relief valve 35 is a conventional, spring biased piston type having the function of returning to the tank 29, through an over-capacity return line 37, the excess of the pressure liquid over and above that which is required for the operation of the hydraulic power mechanism 14. An appropriate adjustable needle type throttling unit 38 associated with relief valve 35 may be employed for the purpose of controlling the speed of reciprocation of the plunger of mechanism 14 by controlling the rate of supply and exhaust of hydraulic liquid through conduits 12, 13. Alternatively, or as a supplement to the function of unit 38, the conduits 12, 13 may be provided with manually adjustable valves 12', 13', respectively.

Liquid returned to solenoid valve 31 from the hydraulic power mechanism 14 through one or the other of the conduits 12, 13, as determined by timer 32, is forwarded to tank 29 through a return line 39. It has been found desirable to employ the special tank construction illustrated in Fig. 1A to cool the returning hydraulic liquid. In order to improve the heat transfer quality of the tank, the latter is provided with horizontal and vertical air tubes 29' extending thereacross and opening to the top, bottom and sides thereof, being, of course, in properly sealed relation to these tank members. Moreover, it is desirable to provide the return lines 37 and 39 to the tank with flared discharge provisions above the normal liquid level in the tank 29 by which the returning oil is sprayed and cooled as it enters the tank. Such means is typified by the flared discharge mouth 37' applied to the line 37.

Referring to Figs. 2, 3 and 4, the central housing section 16 is provided with an enlarged portion 40 in its wall immediately adjoining the intake throat of fitting 23, and the opposite side wall of the casting is similarly shaped at 41. These portions are internally chambered to provide the waste liquid passages of the strainer.

Referring particularly to Figs. 2 and 3, the portion 40 is provided with a pair of vertically elongated waste channels 45, one on either side of the central, vertically elongated intake throat 24'. On the opposite side thereof the housing is provided with a relatively wide recess 47 located inwardly of the enlargement 41 and the vertically elongated discharge throat 25 of the housing, the recess being coextensive in height with the throat and opening to the latter.

A reciprocatory screen, generally designated 48, is guided in sets of parallel, upper and lower ways or guide tracks 50, 51 and 52, 53, respectively, which are formed in the central housing section 16. The screen 48 comprises a transversely extending crosshead 54 which is provided at either end thereof with a pair of parallel, inner and outer, apertured, screen frame members 55, 56, respectively, of flat, generally planar, plate-like construction. Said members are spaced laterally in parallel relation to one another by an intermediate rectangular planar frame 57, in a manner to define a rectangular screen opening 58. The width of this opening exceeds somewhat the spacing of the opposite sides of the respective waste channels 45 from one another.

A braced mesh screen structure, generally designated 59, is mounted in opening 58 to strain liquid impinging the screen from the intake throat 24 as the screen 48 is reciprocated across the housing. Details of construction and a description of the advantages of this particular screen structure will be hereinafter set forth.

On the opposite sides of the screen opening 58 the frame members 55, 56 are provided with extensions in the form of the flat rectangular, imperforate, blocking elements or plates 60. These are of such size and are so spaced from one another that during the time that the screen is passing and being backwashed through one of the backwash channels 45, as indicated by arrows in Fig. 2, the other backwash channel, on the opposite side of intake throat 24', is blocked by an element 60. This insures that in no case will liquid other than that which has been backwashed be discharged into either of the channels 45. Loss of operating efficiency of the installation is accordingly insured against.

The present unit features a dual screen construction, in which the primary and secondary screens are generally designated 62 and 63, respectively, to distinguish the same. However, it is to be understood that the foregoing principles are equally applicable to a single-stage strainer and, of course, to a strainer having more than two stages.

Backwashing results simply from the reverse flow of liquid through the screen into the backwash channel 45 under the pressure in the housing as the screen is progressively exposed to the channels 45 in reciprocating across the latter. Further backwash provisions on the downstream side of the primary screen 62 are not required, the pressure within the housing being adequate to cause the desired backwash flow.

Backwashing of the secondary screen 63 is likewise accomplished solely by the liquid pressure existing in recess 47 on the downstream side of said screen, the discharge and backwash flow at this point being represented by the small arrows. The backwash channels associated with the secondary screen 63 are indicated by the reference numeral 65, being in the form of vertically elongated grooves in the cast backwash members 66 which are disposed immediately adjacent the upstream side of said secondary screen. These members 66 may be integral with the housing section 16, or may be separate members which are appropriately pinned thereto. The primary and secondary screen backwash channels 45, 65, respectively, discharge through the respective passages 67, 68 in section 16 to the well or sump 69 in the bottom of the housing from which the waste liquid is withdrawn through the waste fitting. This fitting connects to the valve controlled waste line 21 leading to an appropriate disposal point. The manually controlled valve 22 in the last named line may be employed to control the rate of flow therein, thereby controlling the desired rate of backwashing, which will vary in different installations.

The invention includes an improved arrangement, shown in Fig. 2, for connecting the screen 48 to the plunger of the hydraulic unit 14, in order to enable the entire screen assembly to be withdrawn from the housing without removing the hydraulic unit. To this end, an elongated screen actuating rod 73 is removably connected to the piston rod 75 of the plunger unit (shown as extending through the end plate 18 of the housing) by a threaded connection 76. The rod 73 is provided with a shoulder abutting the screen frame crosshead 54 at 77, the rod being reduced in diameter adjacent the shoulder and extending through a bore 78 in said crosshead.

A further rod which is used as an indicating element carries an enlarged end 80 which abuts the opposite side of the crosshead 54 and is removably secured to the extremity of actuating rod 73 by means of the threaded connection 81. Accordingly, the indicator rod 79 serves in clamping the screen 48 to rod 73 for reciprocation by the hydraulic unit 14 and is correspondingly reciprocated by the same connection.

Indicator rod 79 extends through a suitable gland or packing 82 in the end wall of the extension 19 of the housing end plate 17, being visible from the exterior of the housing. Thus it is possible to observe the travel of the rod 79 for a check on the rate of reciprocation of the screen structure. The end plate extension 19 receives the screen crosshead 54 in its reciprocation, as indicated by dotted lines in Fig. 2.

When it is desired to remove the screen from the housing, the end plate 17 is removed, whereupon the indicating element 79 is unscrewed to release the screen from the connecting rod 73, following which the screen may be readily withdrawn outwardly. If desired, the connecting rod 73 may be threadedly released from the plunger rod 75 in a similar fashion, although this is ordinarily not necessary.

The screen structure 59 of the strainer is of improved character, in its specific details, as shown in magnified scale in Fig. 6, leading to increased economy of production, greater ruggedness and resistance to damage and wear, and greater efficiency of action. The structure includes a plurality of relatively thin but stiff, plate-like ribs 84 which extend vertically across the frame opening 58 at a right angle to the direction of cross reciprocation. They are of substantial width, in the direction of the thickness of the screen frame, being in the illustrated and preferred embodiment of a width greater than one-half of said thickness but less than the full thickness of the frame. Alternate ribs have their outer side margins substantially flush with the opposite surfaces or sides of the frame, hence they necessarily overlap one another at their inner extremities in the lateral sense. Said ribs are enlarged at their inner side margins and are spaced across the frame in the direction of its reciprocation, in the alternately overlapped or staggered fashion shown in Fig. 6. Accordingly, when the flexible mesh screen 85 of desired fineness is threaded or reeved about the overlapped inner side margins of the ribs 84, a zigzag corrugated screen outline results. This affords a maximum effective straining area for a given cross-sectional area of opening 58. It is evident that in constructions of the foregoing type it is possible to produce practically any effective screening area desired, greatly in excess of that presented by an ordinary flat screen surface. Ribs 84 on the respective halves of the screen are transversely braced and rigidified by the spaced, parallel, horizontal webs 84' formed integral with the ribs. The webs 84' present inner faces of V-shaped outline which engage against and support the screen 85 against distortion. The opposite edges of the ribs 84' lie flush with the outer edges of the ribs, so as to present a coplanar outer surface of ribs and webs. This affords a very desirable sliding bearing for the reciprocating screen in its movement past the backwash channels.

In order to insure proper passage of the liquid through the screen 85, I propose to undercut the ribs rearwardly of the enlarged and rounded outer extremities 85' thereof, as by hollow fillets 86. Accordingly, liquid flowing parallel to ribs 84 is caused to flow through the screen 85 in a direction approximating the normal to its surface.

A further advantage of the above described screen construction arises from the fact that considerable space between any given pair of similarly extending ribs 84 on the upstream side of the screen, and forwardly of the oppositely extending rib on the downstream side, is available for the reception of relatively large objects such as fish, pieces of bark or wood, etc. These objects are caught in the space referred to and discharged through the backwash channel as the screen reaches and passes across the same, without causing any tendency to damage the screen or associated parts.

In operation, liquid entering the intake throat 24' passes through the screen 62 and is filtered thereby as said screen traverses the throat. The screen is simultaneously backwashed through one of the backwash channels 45 through one side of said throat, while the backwash channel on the opposite side of the throat is kept closed by the blocking element 60. These elements act as valves to control the amount of backwash, thereby insuring against waste of liquid other than the backwash liquid. One-half of the screen is active at all times as a strainer during the time that the other half is being backwashed and none of the screen is idle or dead at any time. The amount of backwash water is controllable for any given installation by manipulation of the manual valve 22 in discharge line 21.

The action at the secondary screen 63, of which the element 85 is relatively fine in mesh, is similar to that described above, both as to the straining and backwashing features, and, having passed said secondary screen, the liquid discharges through the throat 25 of discharge fitting 26.

Control of the rate of reciprocation of the screens may be had by throttling at the main control valve element 38, or by individual speed control valves 12', 13' for the purpose of synchronizing the speed of the plunger of hydraulic unit 14 and the timer setting. The speed of reciprocation is ascertained by inspecting the externally projecting indicator rod 79.

The foregoing strainer construction is very simple, compact and inexpensive in its parts but highly efficient in operation. It is possible to wash both screens 62, 63 up to sixty times per minute, as distinguished from existing commercial strainers in which screen washing is performed only three to six times per minute. The improved screen can handle liquids having 25% solids and upwards, in a typical installation using a 30-mesh primary and a 50-mesh secondary screen. This is possible because of the increased effective screen area which is available by the improved corrugated construction. It may be up to six times that of the intake throat area.

The screen construction 59 per se is inexpensive, rugged and reliable, as well as readily and inexpensively replaced in the event of unexpected damage or ultimate wear. It is only necessary to replace the flexible mesh element 85 thereof.

I am aware that those skilled in the art will perceive the possibility of various modifications or alterations of the foregoing strainer without departing from the principle of the invention. I therefore desire that the appended claims be construed to cover all such obvious refinements.

I claim:

1. In a straining apparatus, a housing having intake and discharge passages and means defining a path of liquid flow therebetween, a screen guided for movement in said housing transversely of said path of flow of liquid, backwash means in said housing including waste channels disposed down stream of said screen and on the side thereof toward said intake passage, said channels being spaced from one another on opposite sides of said path of flow, said channels opening to the housing interior in receiving relation to liquid flowing reversely through the screen, said screen comprising a generally planar liquid-pervious straining unit of predetermined area mounted in sliding engagement with the interior of said housing to pass across the opening of said waste channels thereto, and imperforate blocking elements fixed to either side of said straining unit which are spaced from one another in accordance with the spacing of said waste channels and are moved periodically into blocking alignment with the latter, and means to move said screen relative to said backwash means to bring said straining unit and blocking elements in successive alignment with said backwash channels, said blocking elements each being of a size to cover the respective channels and interrupt backwash thereto when so aligned therewith.

2. In a straining apparatus, a housing having intake and discharge passages and means defining a path of liquid flow therebetween, a screen guided for movement in said housing transversely of said path of flow of liquid, backwash means in said housing including waste channels disposed downstream of said screen and on the side thereof toward said intake passage, said channels being spaced from one another on opposite sides of said path of flow, said channels opening to the housing interior in receiving relation to liquid flowing reversely through the screen, said screen comprising a generally planar liquid-pervious straining unit of predetermined area mounted in sliding engagement with the interior of said housing to pass across the opening of said waste channels thereto, said unit being in the form of a wire mesh member, spaced frame members alternately engaging opposite sides of said member and imperforate blocking elements fixed to either side of said straining unit which are spaced from one another in accordance with the spacing of said waste channels and are moved periodically into blocking alignment with the latter, and means to move said screen relative to said backwash means to bring said mesh straining member and blocking elements in successive alignment with said backwash channels, said elements being of sufficient size to block one of the channels to said reverse backwash flow while the other channel is exposed thereto, and vice versa, said blocking elements each being of a size to cover the respective channels and interrupt backwash thereto when so aligned therewith.

3. In a straining apparatus, a housing having intake and discharge passages and means defining a path of liquid flow therebetween, a screen guided for reciprocating movement in said housing transversely of said path of flow of liquid, backwash means in said housing including waste channels disposed downstream of said screen and on the side thereof toward said intake passage, said channels being spaced from one another on opposite sides of said path of flow, said channels opening to the housing interior in receiving relation to liquid flowing reversely through the screen, said screen comprising a generally planar liquid-pervious straining unit of predetermined area mounted in sliding engagement with the interior of said housing to pass across the opening of said waste channels thereto, and imperforate blocking elements fixed to either side of said straining unit which are spaced from one another in accordance with the spacing of said waste channels and are moved periodically into blocking alignment with the latter, and means to reciprocate said screen across said backwash means to bring said straining unit and blocking elements in successive alignment with said backwash channels, said blocking elements each being of a size to cover the respective channels and interrupt backwash thereto when so aligned therewith.

4. In a straining apparatus, a housing having intake and discharge passages and means defining a path of liquid flow therebetween, a screen guided for movement in said housing transversely of said path of flow of liquid, plural backwash means in said housing spaced from one another on opposite sides of said path of flow in receiving relation to liquid flowing through the screen, said screen comprising a generally planar liquid-pervious straining unit of predetermined area mounted in sliding engagement with the interior of said housing to pass across the opening of said waste channels thereto, and imperforate blocking elements fixed to either side of said straining unit which are spaced from one another in accordance with the spacing of said waste channels and are moved periodically into blocking alignment with the latter, and means to move said screen relative to said backwash means to bring said straining unit and blocking elements in successive alignment with said backwash means, said blocking elements each being of a size to cover the respective channels and interrupt backwash thereto when so aligned therewith.

5. In a straining apparatus, a housing having intake and discharge passages and means defining a path of liquid flow therebetween, a screen guided for reciprocation in said housing transversely of said path of flow of liquid, means to reciprocate said screen, and backwash means in said housing including waste channels on the downstream side of said screen which are spaced from one another in the direction of reciprocation of the screen and are in receiving relation to liquid flowing reversely through the screen, said screen comprising a supporting frame provided with a pervious straining member and imperforate blocking elements on either side of said straining member which are spaced from one another in accordance with the spacing of said waste channels to block one thereof to said reverse backwash flow while the other channel is exposed thereto, and vice versa, said blocking elements each being of a size to cover the respective channels and interrupt backwash thereto when aligned therewith.

6. In a liquid straining apparatus characterized by a housing having aligned intake and discharge passages and means defining a path of liquid flow therebetween, a screen frame mounted to travel across said path of liquid flow, said frame having a plurality of laterally spaced ribs extending thereacross, which ribs are disposed with adjacent ends in alternate, transversely overlapped relation to one another in said direction of flow and a flexible foraminated screen unit disposed in zigzag outline about the overlapped ends of said alternate ribs, and means to move said frame transversely of said path of flow in the direction of the plane of the frame.

7. A liquid straining apparatus comprising a housing, a generally planar screen frame movably mounted in said housing, said frame having a plurality of laterally spaced parallel ribs extending from side-to-side thereof, which ribs are disposed with adjacent side margins in alternate transversely overlapped relation to one another, a foraminated mesh screen carried by said frame, said screen being disposed in zigzag outline about alternate overlapped margins of said ribs, said ribs each presenting a convex forward portion in engagement with said screen and a concave side surface connecting said convex portion to the remainder of the rib to direct flow paralleling the latter through the screen at a substantial angle thereto, backwash means in said housing in sliding relation to said screen frame and in receiving relation to said screen, and means to move said frame transversely of said last named means in the direction of the plane of the frame.

8. A liquid straining apparatus comprising a housing, a generally planar screen frame of predetermined thickness movably mounted in said housing, said frame having a plurality of laterally spaced parallel ribs extending from side-to-side thereof, which ribs are of less width than the thickness of said frame and are disposed with adjacent side margins in alternate transversely overlapped relation to one another, the respective alternate overlapped rib margins terminating in transversely spaced relation to the opposite surfaces of said frame, a foraminated mesh screen carried by said frame, said screen being disposed in zigzag outline about alternate overlapped margins of said ribs, said ribs each presenting a convex forward portion in engagement with said screen and a concave side surface connecting said convex portion to the remainder of the rib to direct flow paralleling the latter through the screen at a substantial angle thereto, backwash means in said housing in sliding relation to said screen frame and in receiving relation to said screen, and means to move said frame transversely of said last named means in the direction of the plane of the frame.

9. A liquid straining screen comprising a generally planar screen frame having a plurality of laterally spaced parallel ribs extending from side-to-side thereof, which ribs are disposed with adjacent side margins in alternate transversely overlapped relation to one another, and a foraminated mesh screen element carried by said frame, said screen element being disposed in zigzag outline about the alternate overlapped margins of said ribs, said ribs each presenting a convex forward portion to engage said screen element and a concave side surface connecting said convex portion to the remainder of the rib to direct flow paralleling the latter through the screen element at a substantial angle thereto.

10. A liquid straining screen comprising a generally planar screen frame of predetermined thickness having a plurality of laterally spaced parallel ribs extending from side-to-side thereof, which ribs are of less width than the thickness of said frame and are disposed with adjacent side margins in alternate transversely overlapped relation to one another, the respective alternate overlapped rib margins terminating in transversely spaced relation to the opposite sides of said frame, a foraminated mesh screen element carried by said frame, said screen element being disposed in zigzag outline about said alternate overlapped margins of said ribs, said ribs each presenting a convex forward portion to engage said screen element and a concave side surface connecting said convex portion to the remainder of the rib to direct flow paralleling the latter through the screen element at a substantial angle thereto, and an impervious blocking element of substantial area on said frame adjacent said screen element.

11. A liquid straining apparatus comprising a housing having intake and discharge passages and means defining a path of liquid flow therebetween, a generally planar screen frame mounted to travel across the path of liquid flow, means to move said screen across said path, said frame having a plurality of laterally spaced, slat-like ribs extending thereacross, which ribs are disposed with adjacent side margins in alternate, transversely overlapped relation to one another in said direction of flow, and having parallel, spaced wibs extending between said ribs to rigidify the same, and a flexible foraminated screen unit disposed in zigzag outline about the overlapped margins of said alternate ribs, said webs and ribs presenting side margins substantially flush with the respective opposite side surfaces of said frame which have sliding and bearing engagement with an interior surface of said housing.

12. A liquid straining apparatus comprising a housing having intake and discharge passages and means defining a path of liquid flow therebetween, a generally planar screen frame mounted to travel across the path of liquid flow, means to move said screen across said path, said frame having a plurality of laterally spaced, slat-like ribs extending thereacross, which ribs are disposed with adjacent side margins in alternate, transversely overlapped relation to one another in said direction of flow, and having parallel, spaced webs extending between said ribs to rigidify the same, and a flexible foraminated screen unit disposed in zigzag outline about the overlapped margins of said alternate ribs, said webs being shaped adjacent the opposite sides of said respective alternate ribs and said webs being substantially coplanar to present a flat bearing surface for sliding engagement with the interior of said housing.

13. A liquid straining apparatus comprising a housing having intake and discharge passages and means defining a path of liquid flow therebetween, a generally planar screen frame mounted to travel across said path of liquid flow, said frame having a plurality of laterally spaced ribs extending thereacross, which ribs are disposed with adjacent side margins in alternate, transversely overlapped relation to one another in said direction of flow, and a flexible foraminated screen unit disposed in zigzag outline about the overlapped margins of said alternate ribs, backwash means in said housing in sliding relation to said screen frame and in receiving relation to said screen unit, a backwash blocking element carried by said screen frame to one side of said screen unit, and means to move said frame back and forth transversely of said path of flow.

14. A liquid straining apparatus comprising a housing having intake and discharge passages and means defining a path of liquid flow therebetween, a generally planar screen frame mounted to travel across said path of liquid flow, said frame having a plurality of laterally spaced ribs extending thereacross, which ribs are disposed with adjacent side margins in alternate, transversely overlapped relation to one another in said direction of flow, and a flexible foraminated screen unit disposed in zigag outline about the overlapped margins of said alternate ribs, backwash means in said housing in sliding relation to said screen frame and in receiving relation to said screen unit, said means including backwash channels in laterally spaced relation to one another on opposite sides of said intake passage and backwash blocking elements carried by said screen frame on opposite sides of said screen unit, and means to move said frame back and forth transversely of said path of flow.

15. As an article of manufacture for use in a liquid straining apparatus, a reciprocatory liquid straining and blocking screen comprising a generally planar frame having a plurality of laterally spaced parallel ribs extending from side-to-side thereof, which ribs are disposed with adjacent side margins in alternate transversely overlapped relation to one another, a foraminated mesh screen element carried by said frame, said screen element being disposed in zigzag outline about the alternate overlapped margins of said ribs, an impervious blocking element on said frame adjacent said screen element, said blocking element having an imperforate surface of substantial area in the plane of a side surface of said screen, said imperforate surface extending a substantial distance outwardly from an end of said screen side surface, and means on said frame to reciprocate the screen in the direction of the plane thereof.

16. As an article of manufacture for use in a liquid straining apparatus, a reciprocatory liquid straining and blocking screen comprising a generally planar frame of predetermined thickness having a plurality of laterally spaced parallel ribs extending from side-to-side thereof, which ribs are of less width than the thickness of said frame and are disposed with adjacent side margins in alternate transversely overlapped relation to one another, the respective alternate overlapped rib margins terminating in transversely spaced relation to the opposite surfaces of said frame, a foraminated mesh screen element carried by said frame, said screen element being disposed in zigzag outline about said alternate overlapped margins of said ribs, an impervious blocking element on said frame adjacent said screen element, said blocking element having an imperforate surface of substantial area in the plane of a side surface of said screen, said imperforate surface extending a substantial distance outwardly from an end of said screen side surface, and means on said frame to reciprocate the screen in the direction of the plane thereof.

RUDOLPH V. SEAHOLM.

References Cited in the file of this patent

UNITED STATES PATENTS

| Number | Name | Date |
|---|---|---|
| 1,585,817 | Bailey | May 25, 1926 |
| 2,077,589 | Seaver | Apr. 20, 1937 |
| 2,184,177 | Burrell | Dec. 19, 1939 |
| 2,253,692 | De Grave | Aug. 26, 1941 |
| 2,310,587 | McNeil | Feb. 9, 1943 |
| 2,340,592 | Holm et al. | Feb. 1, 1944 |

FOREIGN PATENTS

| Number | Country | Date |
|---|---|---|
| 2,328 | Great Britain | 1858 |